(12) United States Patent
Puri et al.

(10) Patent No.: US 12,432,397 B1
(45) Date of Patent: Sep. 30, 2025

(54) FACILITATING DELIVERY OF STREAMING CONTENT FROM A PLURALITY OF CONTENT SERVERS

(71) Applicant: Coupang Corp., Seoul (KR)

(72) Inventors: Rohit Puri, Seoul (KR); Choong Ping Teo, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 18/768,516

(22) Filed: Jul. 10, 2024

(51) Int. Cl.
  *H04N 21/222* (2011.01)
  *G06F 16/955* (2019.01)
  *H04N 21/24* (2011.01)

(52) U.S. Cl.
  CPC ......... *H04N 21/222* (2013.01); *G06F 16/955* (2019.01); *H04N 21/24* (2013.01)

(58) Field of Classification Search
  None
  See application file for complete search history.

(56) References Cited

U.S. PATENT DOCUMENTS

| | | | | |
|---|---|---|---|---|
| 10,440,148 | B1* | 10/2019 | Richter | H04L 41/0896 |
| 2013/0013730 | A1* | 1/2013 | Li | H04L 61/4511 709/217 |
| 2014/0230003 | A1* | 8/2014 | Ma | H04N 21/4147 725/115 |
| 2017/0187768 | A1* | 6/2017 | Huang | H04L 67/1021 |

\* cited by examiner

*Primary Examiner* — Junior O Mendoza
(74) *Attorney, Agent, or Firm* — Fish & Richardson P.C.

(57) ABSTRACT

A method for facilitating delivery of streaming content from content servers includes: receiving, from a user device at one or more computing devices remote with respect to the content servers, a first request for a first set of data segments of the content, identifying, based on information on performance parameters of the content servers, a first content server for delivering the first set, transmitting, to the user device, a first response including a list of uniform resource locators (URLs) for obtaining the first set, receiving, from a user device, a second request for a second set of data segments of the content, where the first and second requests are received within a same content playback session, identifying, based on the information, a second content server for delivering the second set, and transmitting, to the user device, a second response including a second list of URLs for obtaining the second set.

20 Claims, 4 Drawing Sheets

FACILITATING DELIVERY OF STREAMING CONTENT FROM A PLURALITY OF CONTENT SERVERS

TECHNICAL FIELD

The present disclosure relates to a system for delivering streaming content, and more particularly, a method of facilitating delivery of streaming content from a plurality of content servers.

BACKGROUND

A Global Traffic Manager (GTM) in a content-streaming system coordinates delivery of content from multiple content delivery networks (CDNs) to user devices. Operating at the domain name system (DNS) level, a GTM coordinates delivery of streaming content from one of multiple CDNs based on factors such as proximity and load.

SUMMARY

The present disclosure is directed to facilitating delivery of streaming content from a plurality of content servers.

According to one aspect of the subject matter described in this application, a method for facilitating delivery of streaming content from a plurality of content servers can include: receiving, from a user device at one or more computing devices remote with respect to the content servers, a first request for a first set of data segments of the streaming content, identifying, based on information on one or more performance parameters of the plurality of content servers, a first content server for delivering the first set of data segments, transmitting, to the user device, a first response to the first request, the first response including a list of uniform resource locators (URLs) for obtaining the first set of data segments from the first content server, receiving, from a user device at the one or more computing devices, a second request for a second set of data segments of the streaming content, where the first request and the second request are received within a same content playback session, identifying, based on the information on the one or more performance parameters of the plurality of content servers, a second content server for delivering the second set of data segments, and transmitting, to the user device, a second response to the second request, the second response including a second list of URLs for obtaining the second set of data segments from the second content server.

Implementations according to this aspect can include one or more of the following features. For example, the one or more computing devices can be configured to communicate with user devices located within a predefined geographical area.

In some implementations, the one or more performance parameters can include at least one of a bandwidth availability, a data transfer latency, a server load, a cache hit ratio, or an error rate of each of the content servers. In some implementations, the one or more performance parameters can be updated based on latency information provided by the user device, the latency information indicating time for data to travel from one of the plurality of content servers to the user device.

In some examples, the first content server can be different from the second content server. In some implementations, the method can further include receiving, at the beginning of the playback session, a master manifest request associated with the playback session, and transmitting, in response to the master manifest request, a list of uniform resource locators (URLs) each corresponding to a content rendition corresponding to a different bitrate.

According to another aspect of the subject matter described in this application, a distributed system for facilitating delivery of streaming content from a plurality of content servers can include a gateway module implemented using one or more computing devices, the gateway module being remote with respect the content servers and configured to communicate with a set of user devices to facilitate delivery of streaming content to the set of user devices. The gateway module can be configured to perform operations comprising: receiving, from a user device, a first request for a first set of data segments of the streaming content, identifying, based on information on one or more performance parameters of the plurality of content servers, a first content server for delivering the first set of data segments, transmitting, to the user device, a first response to the first request, the first response including a list of uniform resource locators (URLs) for obtaining the first set of data segments from the first content server, receiving, from a user device, a second request for a second set of data segments of the streaming content, where the first request and the second request are received within a same content playback session, identifying, based on the information on the one or more performance parameters of the plurality of content servers, a second content server for delivering the second set of data segments, and transmitting, to the user device, a second response to the second request, the second response including a second list of URLs for obtaining the second set of data segments from the second content server.

Implementations according to this aspect can include one or more of the following features. For example, the gateway module can be configured to communicate with user devices located within a predefined geographical area.

In some implementations, the one or more performance parameters can include at least one of a bandwidth availability, a data transfer latency, a server load, a cache hit ratio, or an error rate of each of the content servers. In some implementations, the one or more performance parameters can be updated based on latency information provided by the user device, the latency information indicating time for data to travel from one of the plurality of content servers to the user device.

In some examples, the first content server can be different from the second content server. In some implementations, the operations can further include receiving, at the beginning of the playback session, a master manifest request associated with the playback session, and transmitting, in response to the master manifest request, a list of uniform resource locators (URLs) each corresponding to a content rendition corresponding to a different bitrate.

According to another aspect of the subject matter described in this application, a non-transitory recording medium storing a program, where execution of the program can cause one or more computing devices remote with respect to a plurality of content servers to perform operations comprising: receiving, from a user device, a first request for a first set of data segments of streaming content, identifying, based on information on one or more performance parameters of the plurality of content servers, a first content server for delivering the first set of data segments, transmitting, to the user device, a first response to the first request, the first response including a list of uniform resource locators (URLs) for obtaining the first set of data segments from the first content server, receiving, from a user device at the one or more computing devices, a second request for a second set of data segments of the streaming content, wherein the first request and the second request are received within a same content playback session, identifying, based on the information on the one or more performance parameters of the plurality of content servers, a second content server for delivering the second set of data segments, and transmitting, to the user device, a second response to the second request, the second response including a second list of URLs for obtaining the second set of data segments from the second content server.

Implementations according to this aspect can include one or more of the following features. For example, the one or more computing devices can be configured to communicate with user devices located within a predefined geographical area.

In some implementations, the one or more performance parameters can include at least one of a bandwidth availability, a data transfer latency, a server load, a cache hit ratio, or an error rate of each of the content servers. In some implementations, the one or more performance parameters can be updated based on latency information provided by the user device, the latency information indicating time for data to travel from one of the plurality of content servers to the user device.

In some examples, the first content server can be different from the second content server. In some implementations, the operations can further include receiving, at the beginning of the playback session, a master manifest request associated with the playback session, and transmitting, in response to the master manifest request, a list of uniform resource locators (URLs) each corresponding to a content rendition corresponding to a different bitrate.

DETAILED DESCRIPTION

A traffic management module, e.g., a Global Traffic Manager (GTM), is often used for managing delivery of streaming content (e.g., live video) from multiple content servers (also referred to herein as delivery networks (CDNs)). This module ensures that user requests are efficiently routed to an appropriate CDN, e.g., to optimize performance and resource utilization.

Typically, configuration changes to the GTM, such as adjusting the percentage split of traffic between different CDNs, are performed by a human operator. These operators are responsible for a variety of tasks to ensure that the GTM is properly set up, optimized, and maintained. Moreover, the association of a user device to a CDN is determined when the user device sends the first request for content. The GTM evaluates various performance metrics and other factors to select a suitable CDN corresponding to the initial request. All subsequent requests from the same user-device are pinned to the same CDN, resulting in a static mapping of the user to the CDN for the duration of the playback session. Such static mapping of a CDN to a user device fails to account for changes in network conditions over the playback session, and can potentially lead to service degradation in some cases.

The present disclosure is directed to address the above-referenced issues by monitoring various performance parameters associated with content delivery from CDNs, to thereby account for changing network conditions by dynamically adjusting CDN allocations over a playback session. This in turn can reduce the chances of performance degradation, for example, by seamlessly switching a user device from a degraded CDN to a different CDN that continues to meet performance criteria.

The present disclosure is also directed to a distributed edge-compute-based architecture in which multiple local gateway devices address streaming requests from corresponding subset of user devices—while coordinating among themselves to assign CDNs to the different user devices. The distributed nature of the proposed architecture allows for dedicating more computing resources to process requests from individual user devices, thereby allowing for scaling of complex security protocols. Further, using the distributed architecture together with the dynamic CDN allocation can automate traffic management across multiple CDNs, and thereby allow for highly responsive content streaming that leads to superior user-experiences.

Figure 1:
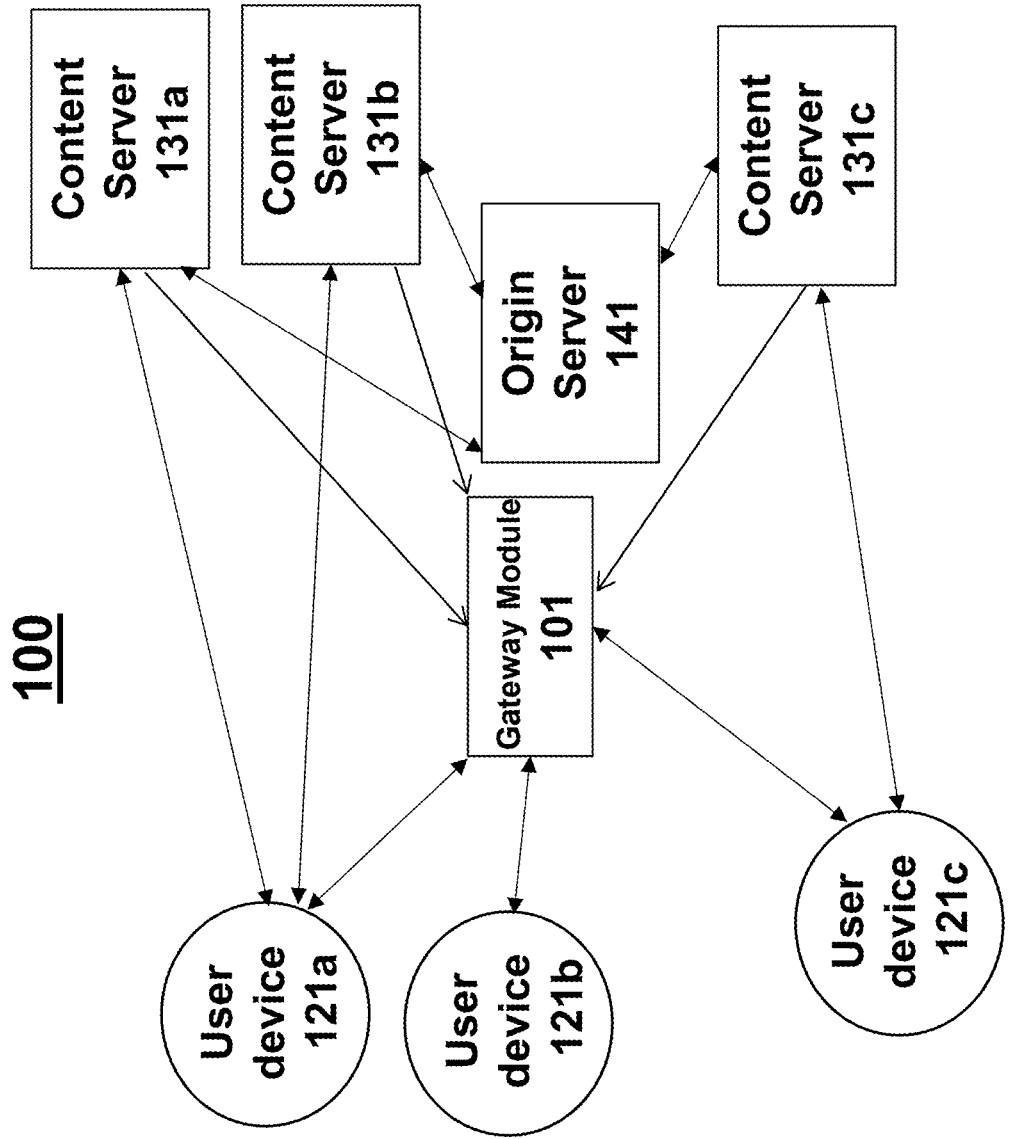
FIG. 1 is a diagram illustrating an example of a system for delivering streaming content from a plurality of content servers.

FIG. 1 is a diagram illustrating an example of a system 100 for delivering streaming content from a plurality of content servers 131a, 131b, and 131c (131, in general) to multiple user devices 121a, 121b, and 121c (121, in general). The system 100 can include a gateway module 101 that coordinates delivery of streaming content from a content server 131 to a user device 121. For example, streaming content (e.g., that is created/generated at an origin server 141) can be hosted at multiple content servers 131 from which the content is made available for the user devices. As such, instead of accessing the streaming content from a single source (e.g., the origin server 141)—which can create overloading and/or bandwidth issues, for example—user devices 121 can access the streaming content from one of multiple content servers 131. Such distribution of content across multiple content servers can allow a user-device 121 to access streaming content from a content server 131 that is not overloaded-thereby allowing for reliable content delivery across a large number of user devices 121. The origin server 141 updates each of the content servers 131 as new content segments are created.

The gateway module 101 is a network component configured to coordinate delivery of streaming content to a user device 121 by instructing the particular user device to access the content from one of the multiple content servers 131 that the gateway module 101 deems appropriate to deliver the content requested by the particular user-device. The gateway module 101 can operate at the DNS level to intercept a request for content originating from a particular user-device and identify—based on evaluating multiple factors such as geographic location, current server load, network latency, and real-time server performance—one of the multiple content servers 131 that the gateway module 101 deems best suited to service the request. For example, the gateway module 101 can dynamically determine, based on a request from a user-device 121a, an optimal content server (e.g., 131b) that would minimize latency, reduce load times, and enhance the overall user experience by ensuring that content is delivered quickly and efficiently. Accordingly, the gateway module 101 can provide notification to the corresponding user-device 121a to obtain the requested content from the content server 131b. This can be done, for example, by providing a uniform resource locator (URL) associated with the requested content hosted at the content server 131b to the user device 121a. The gateway module 101 can continuously monitor the health and performance of the plurality of content servers 131 to determine an appropriate server to allocate for a particular request.

In some systems, an entity referred to as a gateway module (GTM) allocates a content server 131 to a user device 121 at the beginning of a playback session. However, once a GTM allocates a particular content server 131 to a user device 121, the allocation can remain unchanged through the entire playback session. In some cases, if issues arise during the playback session—for example, if the link between the particular content server and the particular user device degrades, or the particular content server goes down—the streaming of content to the particular user-device can become affected. Using the gateway module 101 as described herein, allocation of content servers to a user-device can be evaluated and adjusted even during a playback session, thereby allowing for uninterrupted streaming throughout a playback session even if an adverse event occurs during the session. For example, the gateway module 101 can receive, from a user device 121a, a first request for a first set of data segments of streaming content. The first request can be a request for a media manifest file, where the media manifest file includes a list of uniform resource locators (URLs) for obtaining the first set of data segments from a first content server. In some implementations, the gateway module 101 can identify, based on information on one or more performance parameters of the plurality of content servers 131, a particular content server (e.g., 131c) deemed suitable for delivering the first set of data segments. The one or more performance parameters can include at least one of a bandwidth availability, a data transfer latency, a server load, a cache hit ratio, or an error rate of each of the plurality of content servers 131. The gateway module 101 can determine, by analyzing these parameters, that the content server 131c is an optimum choice to deliver the first set of data segments. Accordingly, the gateway module 101 can provide one or more URLs to the user device 121a that can be used to access the first set of data segments hosted at the identified content server 131c.

In some implementations, performance parameters associated with delivery of content corresponding to the first set of data segments from the identified content server 131c to the user-device 121a are tracked and updated. Based on the updated information on the one or more performance parameters, the gateway module 101 can identify a different content server (e.g., 131b) for delivering a second set of data segments requested by the user-device 121a within the same playback session. For example, when the gateway module 101 receives, from the user device 121a, a second request for a second set of data segments of the streaming content, the gateway module 101 can identify the second content server 131b for delivering the second set of data segments, where the first request and the second request are received within a same content playback session. In some implementations—for example, when the performance parameters do not identify any issues during delivery of content corresponding to the first set of data segments—the first content server (131c, in the current example) can be identified to also deliver the second set of data segments.

The gateway module 101 can transmit, to the user device 121a, a second response to the second request, where the second response includes a second list of URLs for obtaining the second set of data segments from the second content server 131c. Subsequently, the user device 121 can request, from the second content server 131c, content corresponding to the second set of data segments.

Thus, by monitoring the performance parameters associated with content delivery from the plurality of content servers 131, the gateway module 101 can account for changing network conditions by dynamically adjusting content server allocations over a playback session. This in turn can reduce the chances of performance degradation, for example, by seamlessly switching the user device 121 from a degraded content server to a different content server that continues to meet performance criteria.

The user devices 121 can include a smartphone, tablet, laptop, or smart TV, which is an endpoint that is equipped with a web browser or a dedicated streaming application and that interacts with the gateway module 101 to receive streaming content from the plurality of content servers 131. The interaction between a user device 121 and a content server 131 can occur over multiple steps. In some implementations, when a user initiates a request to access streaming content, the corresponding user-device 121 can send a DNS query, which is intercepted by the gateway module 101. For example, the user device 121 can transmit a request for a master manifest file for a playback session of the streaming content. In response to the request for the master manifest file, the gateway module 101 can transmit, to the user device 121, the master manifest file providing one or more available stream variants for the playback session. In some implementations, each variant corresponds to a different bitrate or resolution.

In some implementations, the user device 121 parses the master manifest file to understand its structure and contents. This process can involve, for example, parsing the metadata within the manifest, which includes detailed information about the available streaming variants. Each variant can have a unique URL and attributes such as format, resolution, bitrate, and codec information. The user device 121 can extract this information to compile a list of all the available streaming variants. The user device 121 can evaluate the variants based on several factors, including the current network conditions, device capabilities, and user preferences. For example, if the user device 121 is on a high-speed Wi-Fi connection and the device supports high-definition playback, the user device 121 may prioritize selecting a higher resolution, higher bitrate variant for optimal video quality. Conversely, if the network bandwidth is limited, such as on a mobile data connection, the user device 121 may opt for a lower bitrate variant to prevent buffering and ensure a smooth playback experience.

After assessing the available options, the user device 121 can select the most suitable streaming variant and transmit, to the gateway module 101, a request for a media manifest file corresponding to the selected variant. Subsequently, as discussed above, the gateway module 101 can identify a content server 131 for delivering the data segments of the selected variant and transmit the response including a list of URLs for obtaining the set of data segments from the identified content server 131.

In some implementations, the user device 121 can determine from which content server the user device 121 will receive the first set of data segments. For example, the user device 121 can determine, based on the list of URLs received from the gateway module 101, that the user device 121 will request for the first set of data segments to the first content server 131c among the plurality of content servers 131.

The plurality of content servers 131 can be implemented as distributed network nodes designed to deliver digital content to users with high availability and performance. These servers can cache copies of content, such as web pages, images, videos, and other media, and serve them to users from locations geographically closer to the user than the origin server 141. By reducing the physical distance between the server and the user, the content servers can significantly lower latency, decrease load times, and improve the overall user experience.

When the content server 131 receives a request for content from a user device 121, the content server 131 can parse the request (e.g., by parsing the URL) to determine which specific data segment is being requested. Subsequently, the content server 131 can check its local cache to see if the requested data segment is already stored. If the data segment is found in the local cache (cache hit), the content server can serve the segment to the user device 121. If the data segment is not in the cache (cache miss), the content server 131 can be configured to fetch it from the origin server 141. For example, if the data segment is not available in the local cache, the content server 131 can forward the request to the origin server 141 where the content is initially hosted. The origin server 141 can respond to the content server's request by transmitting the requested data segment. In some implementations, the origin server can be configured to provide the requested data segment directly to the requesting user-device-potentially in addition to providing the data segment also to the corresponding content server for storing within its cache. The content server 131 can cache the received data segment for future requests, to thereby reduce latency and load on the origin server 141 for subsequent requests and deliver the requested data segment to the user device 121.

The user device 121 can transmit information regarding performance of data delivery from the content server 131. For example, the user device 121 can provide latency information indicating time for data to travel from content server 131 to the user device 121. The content server 131 can update information on the one or more performance parameters of the plurality of content servers 131, 132, and 133 based on the latency information received from the user device 121. In some implementations, the content server 131 can forward the latency information to the gateway module 101 to update the information on the one or more performance parameters of the plurality of content servers 131.

Figure 2:
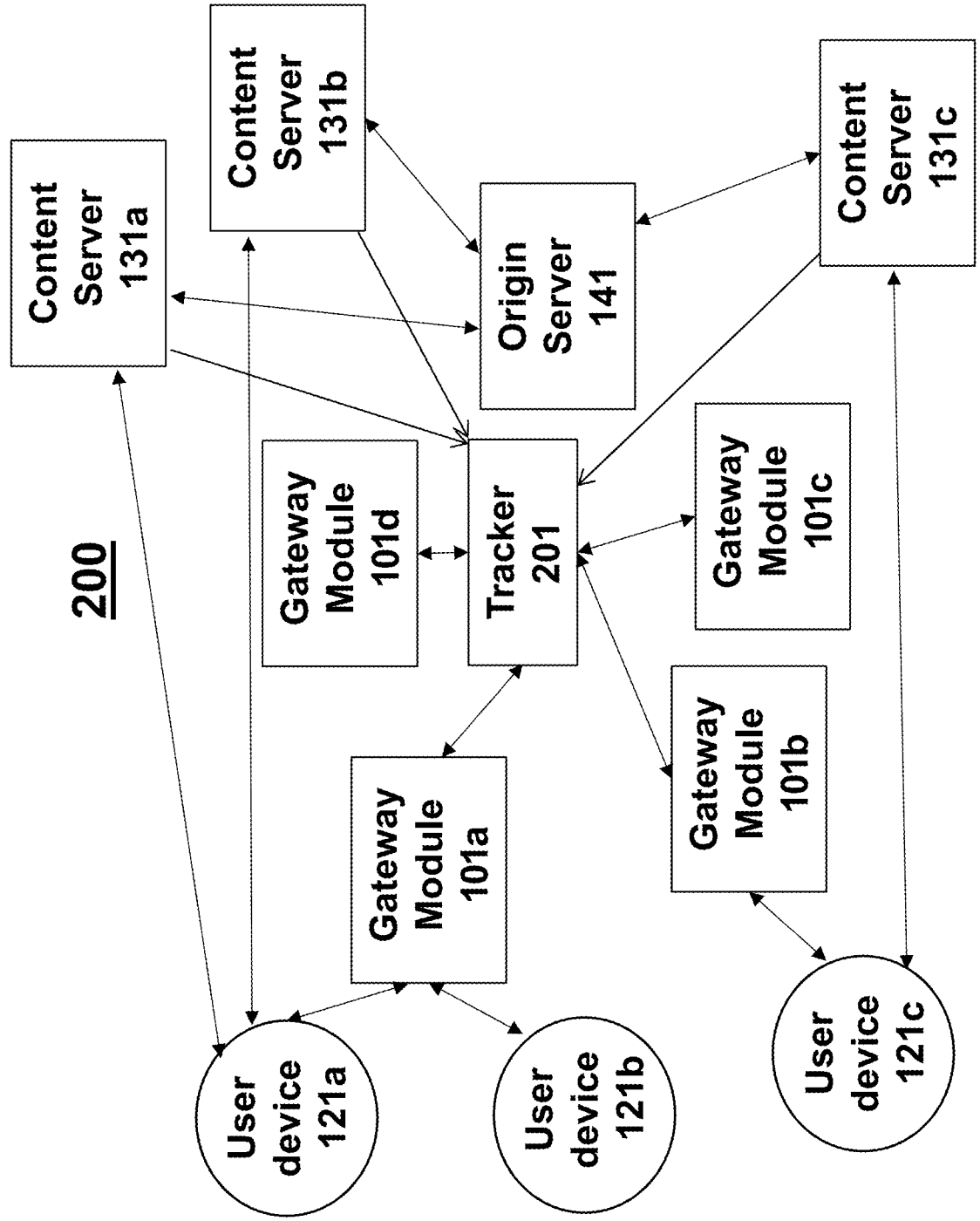
FIG. 2 is a diagram illustrating an example of a distributed system for delivering streaming content from a plurality of content servers.

In some implementations, a distributed system of a plurality of gateway modules 101 can be used to further improve streaming content delivery. FIG. 2 is a diagram illustrating an example of such a distributed system 200 for delivering streaming content from a plurality of content servers 131. In some implementations, instead of all user-devices 121 within a network communicating with a single gateway module 101, subsets of the user-devices 121 can be configured to communicate with one or more gateway modules of the plurality of gateway modules 101. For example, the gateway modules 101a, 101b, 101c, and 101d (101, in general) can be implemented as edge computing nodes of one or more computing devices—each configured to communicate with a subset of user-devices 121 of the network. For example, the gateway module 101a can communicate with a first set of user devices 121a and 121b to facilitate delivery of streaming content, while the gateway module 101b communicates with a second set of user devices including the user device 121c.

Allocation of a subset of user-devices 121 to a gateway module 101 can be done in various ways. In some implementations, the allocation can be based on geographic locations. For example, the gateway modules 101 can be configured to serve distinct geographic locations and communicate with user devices 121 located within corresponding locations. In some implementations, the allocation can be based on other logical groupings. For example, user-devices associated with a particular organization can be allocated to a particular gateway module. In another example, high priority users can be allocated to a gateway module that services only a predetermined number of user-devices.

The gateway modules 101a-101d can perform operations substantially similar to those described with respect to gateway module 101 in FIG. 1. For example, each gateway module can receive, from a user device, a request for a set of data segments of the streaming content, identify, based on information on one or more performance parameters, a content server for delivering the set of data segments, and transmit, to the user device, a response to the request, the response including a list of URLs for obtaining the set of data segments from one of the plurality of content servers. In some implementations, the gateway modules 101a-101d can be configured to allocate multiple content servers to a user-device over the course of a single playback session. In some implementations, the gateway modules can be configured to keep the content server allocation unchanged over the course of a playback session.

In some implementations, the gateway modules 101 can be configured to authenticate the corresponding user devices 121 prior to content being streamed to the devices. For example, a user device initially authenticates with an authorization server using credentials (e.g., username and password). Upon successful authentication, the gateway module 101 can issue an authorization token, which includes encoded information such as the user's identity, expiration time, and permissions. The user device can store this bearer token securely, in memory or a secure storage area to protect against unauthorized access. For subsequent requests from the user devices to receive data segments of streaming content, the user device can include the bearer token in the HTTP Authorization header of each request. Upon receiving a request with a bearer token, the gateway module 101 can validate the token by checking its integrity and authenticity, which may involve verifying the token's signature and ensuring it has not expired. In some implementations, the gateway module 101 can check the token's claims to ensure the user device has the necessary permissions to access the requested data. If the token is valid and the user device has the necessary permissions, the gateway module 101 can process the request and return the appropriate response. For example, the gateway module 101 can process user device's request for a set of data segments of the streaming content, and, if the token is valid and the user device has the necessary permissions, can return the response including a list of uniform resource locators (URLs) for obtaining the set of data segments from one of the plurality of content servers 131. If the token is invalid or expired, or if the user device lacks the required permissions, the gateway module 101 can be configured to deny access and send a response accordingly.

The distributed system of the gateway modules 101—as shown in FIG. 2—can provide several technical advantages. For example, in examples where security is provided by a gateway module, such a distributed system allows for dedicating potentially more computing resources to process requests from individual user devices, thereby allowing for scaling of complex security protocols. By performing the authorization process at the gateway modules, the requests from the user devices can be terminated at a gateway module that is the nearest to the user device, rather than having a central module to perform the authorization for all requests. Further, the distributed system of gateway modules can itself be made scalable, allowing for addition of new gateway modules as more user-devices are added to a network. This in turn allows for scaling of the overall streaming system— allowing for arbitrarily large number of user-devices to access a streaming service potentially with negligible or no degradation of service. The distributed system of gateway modules 101 can also allow for scalable and customizable allocation of computing resources—for example, as a function of the number of user-devices allocated to corresponding gateway modules-thereby allowing for a flexible, scalable, and high-performing streaming platform configured to service a large number of user-devices.

In some implementation, the system 200 includes a centralized performance tracker 201 that tracks the performance parameters affecting content delivery from the content servers 131. For example, the performance tracker 201 can receive, from the plurality of content servers 131, one or more performance parameters associated with content delivery from the plurality of content servers and update information accordingly. In some implementations, the performance tracker 201 can forward the information on the one or more performance parameters to the gateway modules 101 such that the gateway modules 101 can identify, based on the information, a content server for delivering a requested set of data segments.

Figure 3:
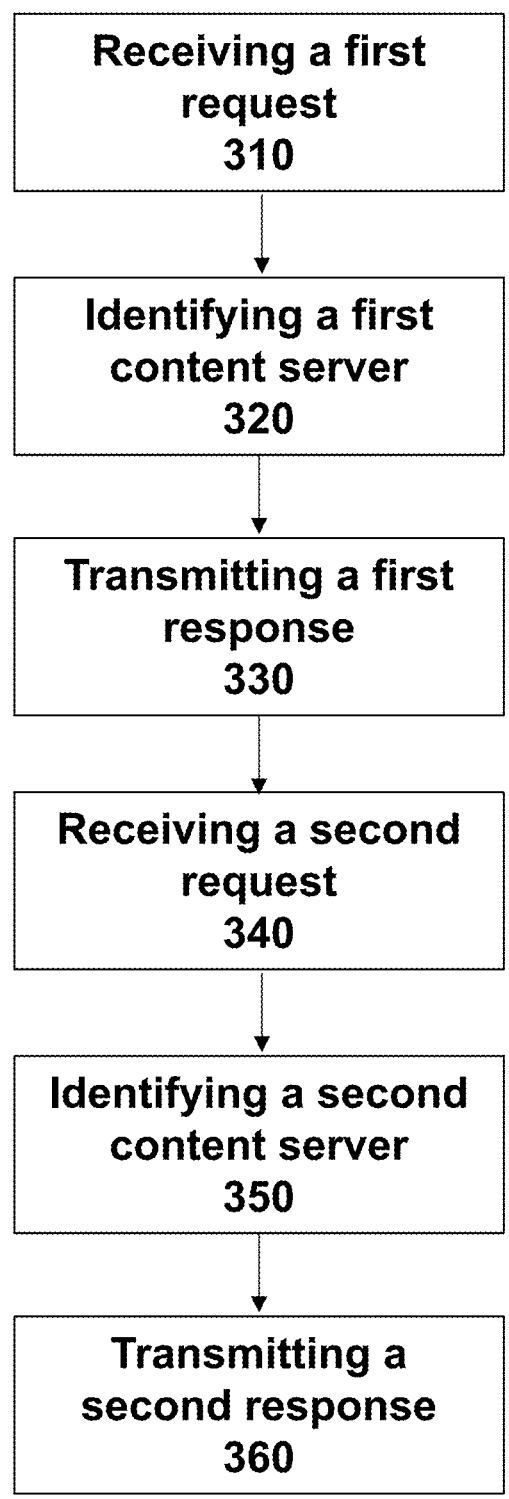
FIG. 3 is a flowchart showing an exemplary process for delivering streaming content from a plurality of content servers.

FIG. 3 is a flowchart showing an exemplary process 300 for delivering streaming content from a plurality of content servers 131. As discussed above with respect to FIGS. 1 and 2, at least a portion of the process 300 can be performed by various elements of the system 100 or the distributed system 200.

Operations of the process 300 can include receiving, from a user device, a first request for a first set of data segments of the streaming content (310). For example, the gateway module 101 can receive a request for a media manifest file including a list of uniform resource locators (URLs) for obtaining the first set of data segments from a content server. In some implementations, a gateway module 101 can receive, from a user device 121, a request for a master manifest file for a playback session of the streaming content. In response to the request for the master manifest file, the gateway module 101 can transmit, to the user device 121, the master manifest file providing one or more available stream variants for the playback session. For example, each variant can correspond to a different bitrate or resolution. The media manifest file can correspond to a variant selected at the user device 121.

Operations of the process 300 can include identifying, based on information on one or more performance parameters of the plurality of content servers, a first content server for delivering the first set of data segments (320). For example, the gateway module 101 can receive, from the plurality of content servers 131, the information on one or more performance parameters including at least one of a bandwidth availability, a data transfer latency, a server load, a cache hit ratio, or an error rate of each of the plurality of content servers 131. The gateway module 101 can receive, from the performance tracker 201, the information on one or more performance parameters.

Operations of the process 300 also includes transmitting, to the user device, a first response to the first request, where the first response includes a list of uniform resource locators (URLs) for obtaining the first set of data segments from the first content server (330). In some implementations, the first response can be response to a media manifest file. Operations of the process 300 also includes receiving, from a user device, a second request for a second set of data segments of the streaming content, where the first request and the second request are received within a same content playback session (340), and identifying, based on the information on the one or more performance parameters of the plurality of content servers, a second content server for delivering the second set of data segments (350). In some implementations, a content server can update information on the one or more performance parameters based on information regarding performance of data delivery received from the user device. For example, a user device 121 can provide latency information indicating time for data to travel from content server 131 to the user device 121. In some implementations, the content server 131 can forward the latency information to a gateway module 101 to update the information on the one or more performance parameters.

In some implementations, the gateway module 101 can receive, from a performance tracker 201, the information on the one or more performance parameters of the plurality of content servers. For example, the performance tracker 201, which receives one or more performance parameters from the plurality of content servers, can update information accordingly and forward the updated information to the gateway module 101. In some implementations, the performance tracker 201 can forward one or more performance parameters received from the plurality of content servers to the gateway module 101 for the gateway module 101 to update information on the one or more performance parameters.

Operations of the process 300 includes transmitting, to the user device, a second response to the second request, where the second response includes a second list of URLs for obtaining the second set of data segments from the second content server (360). As such, data segments are received from multiple content servers within the same playback session-thereby allowing for accounting for service degradation associated with one or more of the multiple content servers within the same playback session.

Figure 4:
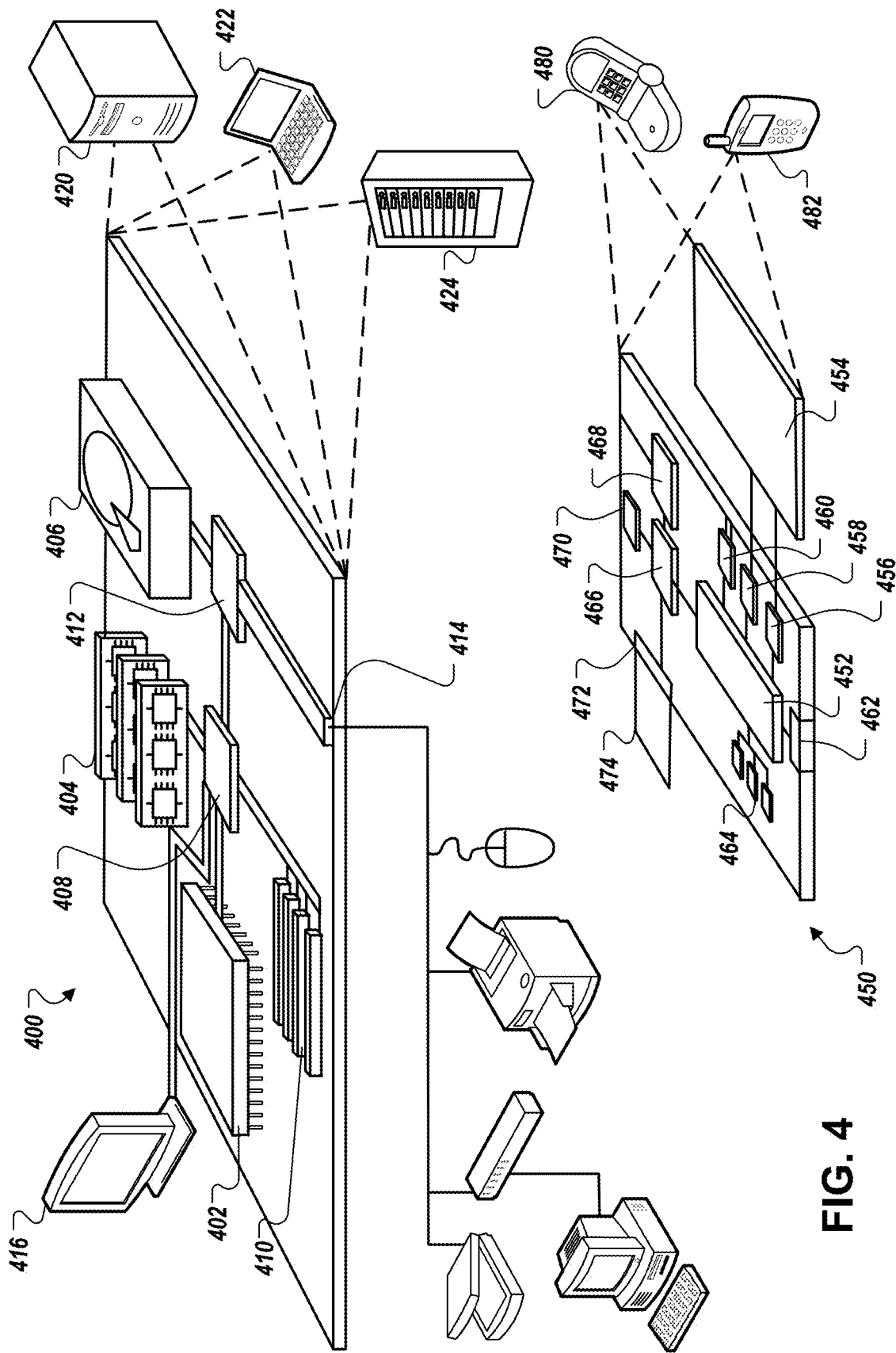
FIG. 4 is a diagram illustrating a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing devices 400 and the mobile computing device 450, and an entire system may be made up of multiple computing devices communicating with each other. The computing device 400 may be implemented in the plurality of content servers 131, 132, and 133, the origin server 141, the gateway modules 111, 112, 113, and 114, and the performance tracker 201, described with respect to FIGS. 1-3.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation—and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the user devices 121, 122, and 123 described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method for facilitating delivery of streaming content from a plurality of content servers, the method comprising:
   receiving, from a user device at one or more computing devices remote with respect to the content servers, a first request for a first set of data segments of the streaming content;
   identifying, based on information on one or more first performance parameters of the plurality of content servers, a first content server for delivering the first set of data segments;
   transmitting, to the user device, a first response to the first request, the first response including a first list of uniform resource locators (URLs) for obtaining the first set of data segments from the first content server;
   receiving, from the user device at the one or more computing devices, a second request for a second set of data segments of the streaming content, wherein the first request and the second request are received within a same content playback session;
   identifying, based on information on one or more second performance parameters of the plurality of content servers, a second content server for delivering the second set of data segments of the same content playback session, the one or more second performance parameters being updated based on operational conditions of the plurality of content servers and after the transmission of the first response; and
   transmitting, to the user device, a second response to the second request, the second response including a second list of URLs for obtaining the second set of data segments from the second content server.

2. The method of claim 1, wherein the one or more computing devices are configured to communicate with user devices located within a predefined geographical area.

3. The method of claim 1, wherein the one or more first performance parameters and the one or more second performance parameters include at least one of a bandwidth availability, a data transfer latency, a server load, a cache hit ratio, or an error rate of each of the content servers.

4. The method of claim 1, wherein the one or more second performance parameters are updated based on latency information provided by the user device, the latency information indicating time for data to travel from one of the plurality of content servers to the user device.

5. The method of claim 1, wherein the first content server is different from the second content server.

6. The method of claim 1, further comprising:
   receiving, at the beginning of the playback session, a master manifest request associated with the playback session; and
   transmitting, in response to the master manifest request, a list of uniform resource locators (URLs) each corresponding to a content rendition corresponding to a different bitrate.

7. The method of claim 1, wherein the second set of data segments is parsed after the first set of data segments has been parsed.

8. A distributed system for facilitating delivery of streaming content from a plurality of content servers, the distributed system comprising:
- a gateway module implemented using one or more computing devices, the gateway module being remote with respect the content servers and configured to communicate with a set of user devices to facilitate delivery of streaming content to the set of user devices,
- wherein the gateway module is configured to perform operations comprising:
- receiving, from a user device, a first request for a first set of data segments of the streaming content;
- identifying, based on information on one or more first performance parameters of the plurality of content servers, a first content server for delivering the first set of data segments;
- transmitting, to the user device, a first response to the first request, the first response including a first list of uniform resource locators (URLs) for obtaining the first set of data segments from the first content server;
- receiving, from the user device, a second request for a second set of data segments of the streaming content, wherein the first request and the second request are received within a same content playback session;
- identifying, based on information on one or more second performance parameters of the plurality of content servers, a second content server for delivering the second set of data segments of the same content playback session, the one or more second performance parameters being updated based on operational conditions of the plurality of content servers and after the transmission of the first response; and
- transmitting, to the user device, a second response to the second request, the second response including a second list of URLs for obtaining the second set of data segments from the second content server.

9. The distributed system of claim 8, wherein the gateway module is configured to communicate with user devices located within a predefined geographical area.

10. The distributed system of claim 8, wherein the one or more first performance parameters and the one or more second performance parameters include at least one of a bandwidth availability, a data transfer latency, a server load, a cache hit ratio, or an error rate of each of the content servers.

11. The distributed system of claim 8, wherein the one or more second performance parameters are updated based on latency information provided by the user device, the latency information indicating time for data to travel from one of the plurality of content servers to the user device.

12. The distributed system of claim 8, wherein the first content server is different from the second content server.

13. The distributed system of claim 8, wherein the operations further comprise:
- receiving, at the beginning of the playback session, a master manifest request associated with the playback session; and
- transmitting, in response to the master manifest request, a list of uniform resource locators (URLs) each corresponding to a content rendition corresponding to a different bitrate.

14. The distributed system of claim 8, wherein the second set of data segments is parsed after the first set of data segments has been parsed.

15. A non-transitory recording medium storing a program, wherein execution of the program causes one or more computing devices remote with respect to a plurality of content servers to perform operations comprising:
- receiving, from a user device, a first request for a first set of data segments of streaming content;
- identifying, based on information on one or more first performance parameters of the plurality of content servers, a first content server for delivering the first set of data segments;
- transmitting, to the user device, a first response to the first request, the first response including a first list of uniform resource locators (URLs) for obtaining the first set of data segments from the first content server;
- receiving, from the user device at the one or more computing devices, a second request for a second set of data segments of the streaming content, wherein the first request and the second request are received within a same content playback session;
- identifying, based on information on one or more second performance parameters of the plurality of content servers, a second content server for delivering the second set of data segments of the same content playback session, the one or more second performance parameters being updated based on operational conditions of the plurality of content servers and after the transmission of the first response; and
- transmitting, to the user device, a second response to the second request, the second response including a second list of URLs for obtaining the second set of data segments from the second content server.

16. The non-transitory recording medium of claim 15, wherein the one or more computing devices are configured to communicate with user devices located within a predefined geographical area.

17. The non-transitory recording medium of claim 15, wherein the one or more first performance parameters and the one or more second performance parameters include at least one of a bandwidth availability, a data transfer latency, a server load, a cache hit ratio, or an error rate of each of the content servers.

18. The non-transitory recording medium of claim 15, wherein the one or more second performance parameters are updated based on latency information provided by the user device, the latency information indicating time for data to travel from one of the plurality of content servers to the user device.

19. The non-transitory recording medium of claim 15, wherein the first content server is different from the second content server.

20. The non-transitory recording medium of claim 15, wherein the operations further comprise:
- receiving, at the beginning of the playback session, a master manifest request associated with the playback session; and
- transmitting, in response to the master manifest request, a list of uniform resource locators (URLs) each corresponding to a content rendition corresponding to a different bitrate.

\* \* \* \* \*